United States Patent [19]
Bowers et al.

[11] 3,867,505
[45] Feb. 18, 1975

[54] METHOD AND APPARATUS FOR CHLORINATING METAL BEARING MATERIALS

[75] Inventors: Bobby O. Bowers, Paden City, W. Va.; Stanley F. Brzozowski, Coraopolis, Pa.

[73] Assignee: PPG Industries, Inc., Pittsburgh, Pa.

[22] Filed: June 22, 1973

[21] Appl. No.: 372,865

Related U.S. Application Data

[62] Division of Ser. No. 192,126, Oct. 26, 1971, abandoned.

[52] U.S. Cl.................. 423/74, 423/79, 423/492
[51] Int. Cl............................................. C01g 23/02
[58] Field of Search..................... 423/74, 79, 492

[56] References Cited
UNITED STATES PATENTS

| | | | |
|---|---|---|---|
| 2,946,654 | 7/1960 | Hnilicka, Jr. | 423/74 |
| 3,086,843 | 4/1963 | Evans et al. | 423/74 |
| 3,144,303 | 8/1964 | Engelmann | 423/79 X |
| 3,475,117 | 10/1969 | Kleinfelder | 423/74 |
| 3,699,206 | 10/1972 | Dunn, Jr. | 423/74 |
| 3,746,516 | 7/1973 | Michaud | 423/74 |

*Primary Examiner*—Edward Stern
*Attorney, Agent, or Firm*—Irwin M. Stein

[57] ABSTRACT

The chlorination of metal-bearing materials, e.g., titaniferous ores, to produce metal halides, e.g., titanium tetrachloride, in a fluidized bed maintained in a cylindrical-type furnace is described. Fluidizing and chlorinating gas is introduced into the furnace through gas distributor means having a single vertical gas exit opening, at least one principal linear dimension thereof measured across the opening being no greater than seven thirty-seconds inch. In a preferred embodiment, the gas exit opening has a cross-sectional area at the point of gas discharge of from about 0.00019 inch² to about 0.038 inch².

7 Claims, 4 Drawing Figures

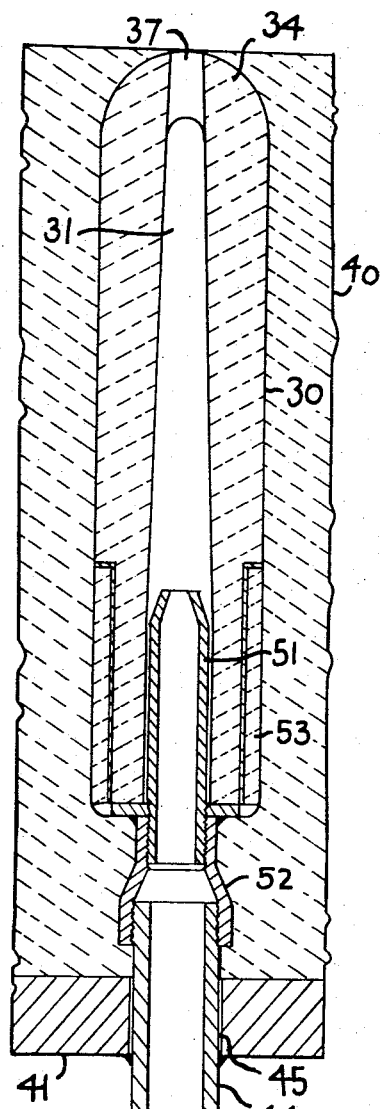
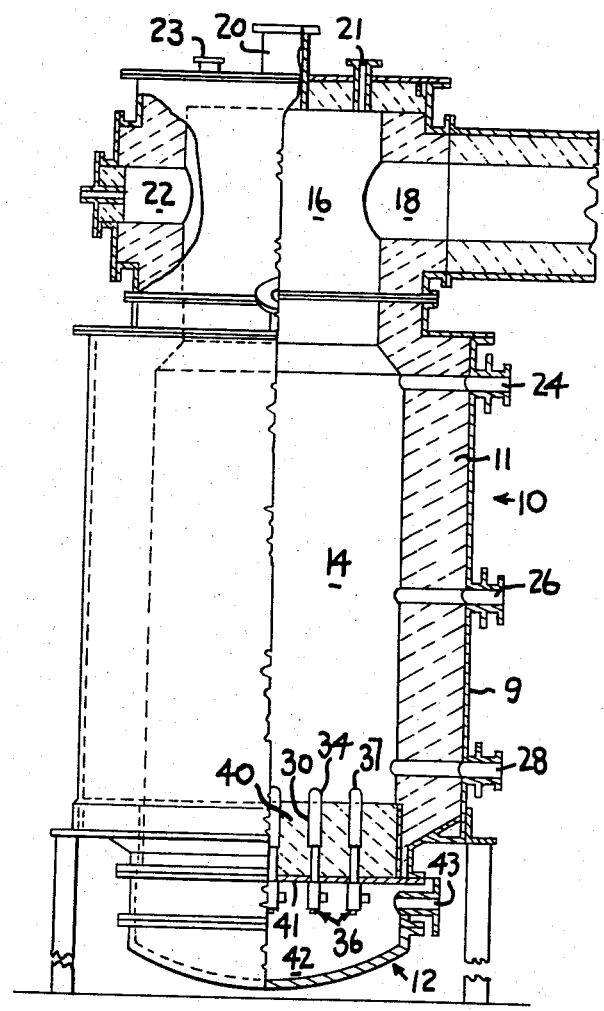
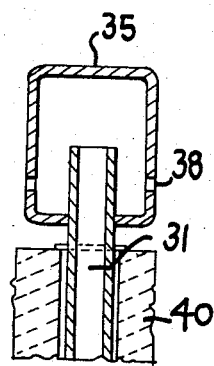
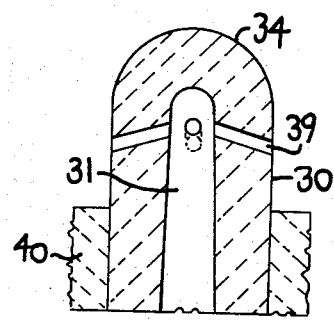
FIG. 1
FIG. 2
FIG. 3
FIG. 4

METHOD FOR CHLORINATING METAL BEARING MATERIALS

This is a division, of application Ser. No. 192,126, filed Oct. 26, 1971, now abandoned.

DESCRIPTION OF THE INVENTION

The chlorination of particulate metal-bearing materials in a fluidized bed of the material maintained in a cylindrical furnace is well known. This chlorination technique and apparatus therefor, especially for the chlorination of titanium-bearing materials, is described in U.S. Pats. Nos. 2,855,273, 2,957,757, 3,017,254, 3,057,701, 3,086,843 and 2,856,264. Typically, the apparatus described in several of the aforementioned United States patents comprises a cylindrical furnace having an interior portion providing a chlorination zone and a plenum or chlorine chamber at its lower end. The chlorine chamber is separated from the bed and chlorination zone by a perforated base plate which forms the floor of the furnace. The perforations in the base define a gas channel extending from the chlorine chamber to a point of discharge in the chlorination zone and are usually occupied by gas distributor tubes of one design or another. The head of the gas distributor tubes, i.e., the end within or adjacent the chlorination zone, is typically closed at its top to prevent the bed solids from passing down through the open channel in the distributor tube and into the plenum chamber. This arrangement prevents plugging of the gas distributor tubes by the bed particles when the bed is defluidized. Chlorine exit ports are provided in the side or bottom (underside) of the gas distributor tube head to allow the chlorine to pass into the chlorination zone.

One of the principal difficulties which has been encountered in the practice of the aforementioned fluid bed process with such gas distributor tubes has been the severe erosion of the furnace base (floor) and breakage of the gas distributor tubes. Further, when the chlorine gas exits from the side or bottom of the gas distributor head, it tends to combine readily with adjacent exiting streams of chlorine to form larger pockets of chlorine gas which causes slugging (the formation of large gas bubbles) within the bed and irregular or choppy bed motion. In addition, the position of the chlorine exit ports bears strongly upon the type of erosion suffered by the furnace base. Thus, if the exiting chlorine stream is directed at the base, erosion thereof will be particularly severe.

It has now been discovered that fluidizing and chlorine gas can be introduced into a fluid bed furnace through gas distributor means having a single vertical gas exit opening without plugging the opening upon defluidization of the bed. In particular, it has been discovered that if at least one principal linear dimension of the opening measured across the opening is not greater than seven thirty-seconds inch, little bed flow back upon defluidization occurs. In a preferred embodiment, the cross-sectional area of the gas exit opening adjacent to or within the chlorination zone is from 0.00019 inch$^2$ to about 0.038 inch$^2$. In addition, it has been observed that over-all fluidization of the bed is improved, i.e., it is smoother, the life of the furnace base and gas distributor tubes are extended and longer gas retention times within the bed obtained with the use of such gas distributor means. Further, the bed is easily refluidized after having been defluidized for several hours. While not wishing to be bound by any particular theory, it appears that the bed particles are able to bridge the gas exit port when the bed is defluidized, thereby blocking the flow of bed particles down through the otherwise open channel.

BRIEF DESCRIPTION OF THE DRAWINGS

The nature of the method and apparatus referred to herein and the inventive embodiments thereof will be more fully understood by reference to the ensuing disclosure taken with the accompanying drawings, in which:

FIG. 1 is a diagrammatic elevational view, partially in section, of a cylindrical furnace suitable for the practice of a preferred embodiment of the present invention;

FIG. 2 is an enlarged sectional view of a chlorine gas distributor similar to those shown in FIG. 1 and illustrating a convenient method for mounting such conduit means in the furnace floor;

FIG. 3 is an enlarged sectional view of the upper portion of a chlorine gas distributor tube of the prior art; and FIG. 4 is an enlarged sectional view of the upper portion of a further chlorine gas distributor tube of the prior art.

DETAILED DESCRIPTION

This invention relates to novel method and means for charging a fluidizing and reactant medium, e.g., a chlorinating gas such as elemental chlorine, into a fluidized bed reactor. In particular, this invention relates to improved method and apparatus which will effect an even flow of fluidizing vapor into said reactor during its operational periods, while preventing significant back flow of solids upon defluidization of the bed, and which will allow unimpeded startup upon resumption of the fluidization operation.

Fluidized solids processes, such as those employed for chlorinating a titanium-bearing material in the presence of a carbonaceous reducing agent, are most efficient when the entering chlorinating gas is uniformly distributed over the entire cross-section of the portion of the furnace containing the fluidized bed so that maximum contact between the chlorinating gas and the solid bed particles is accomplished. Such uniform distribution enhances the efficient utilization of the chlorinating gas and minimizes the presence of unreacted chlorine in the product gas stream removed from the furnace. One of the most commonly used type of apparatus in large scale operations for the chlorination of titaniferous materials is a cylindrical type furnace with a bottom or floor containing a plurality of perforations which serve as conduits for the gas. The perforations in the floor, which are usually occupied with gas distributor means of various designs, serve to connect the chlorine plenum chamber with the chlorination zone in the reactor and to distribute evenly the fluidizing gas in the reactor. While good gas distribution can be obtained without gas distributor tubes by positioning constricting orifices below the furnace floor level and within the aforementioned perforations or extensions thereof in the plenum chamber, this has been unsatisfactory in the past because objectionable solid back flow has been encountered upon cessation of the normal upward flow of fluidizing gas. As a consequence, objectionable plugging of the vertical conduits in the furnace floor occurs and a costly shutdown and clean-out operation must be resorted to prior to the resumption of the fluidization operation. This is particularly true in instances where the solids present become soft or sticky in nature.

In an effort to overcome the objectionable plugging and solid back flow problem, the gas conduits or distributor tubes have been covered with a head or cover which is closed at the top and which has, in one embodiment, several horizontal ports, or several ports angled downward from the horizontal on the sides of the head or, in another embodiment, several ports on the underside of the bed. Refractory materials are most commonly used for the furnace floor and gas distributors because of the relatively high temperatures used in chlorination reactions (850° – 1300° C.) and the corrosive character of the reactant and product gases. However, refractory gas distributor tubes are relatively fragile and break easily while in service. As a consequence, solids drop into the gas conduits or distributor tubes connecting the chlorine chamber and chlorination zone during non-operating periods, thereby plugging the conduits or damaging the orifices located at the lower end thereof and causing poor gas distribution and a loss in reaction efficiency.

The present invention will be better understood by reference to the drawings and to the ensuing description. Referring now to FIG. 1, there is shown a furnace in which chlorination reactions, such as herein contemplated, can be conducted. Specifically, there is shown cylindrical furnace 10 having a chlorination or reaction zone section 14, a top section 16 and a bottom or fluidizing gas, e.g., chlorine, distributor section 12. The steel shell 9 within the reactor section 14 is usually lined with refractory material 11, usually refractory brick, that is capable of withstanding the chemical and physical attack of chlorine, reactants and reaction products at the temperatures of operation. The internal diameter of the furnace can be of any convenient size and, in commercial operations, normally exceeds 3 feet. Outlets 24, 26 and 28 extend through the reactor shell and refractory wall and provide means for withdrawing samples of the bed or the product chloride vapors, or for introduction of coolants, such as titanium tetrachloride into the bed.

Disposed in the top section 16 is product outlet conduit means 18 for removal of reaction products resulting from the chlorination of the metal-bearing material in chorination zone 14 and an inlet 22 for the introduction of ore and carbon feed into the reactor section 14. Inlets 20, 21 and 23 are provided in the top of the furnace for easy access into the furnace from the top.

The chlorine distributor section 12 is usually removably attached to the bottom of the reactor section 14 for ease in maintenance and is designed to provide a uniform supply of chlorinating gas to the bed within the reaction zone. This section typically comprises refractory base 40, resting upon metal plate 41, which is bolted to the bottom of the furnace, the base and plate serving as the bottom or floor of the reactor, a plenum or chlorine chamber 42, and inlet conduit means 43 for introducing chlorine into the chamber from a source not shown.

The type refractory material used in the various parts of the furnace is not critical to the present invention and wil vary depending upon the service in which the refractory is used. Naturally, the refractory should be non-porous and resistant to chlorine and the corrosive environment existing in the reactor at the temperatures of operation. High alumina and silica-type refractories have been recommended for chlorine service. The particular refractories used will vary with the manufacturer and are well known to the skilled artisan. Typically, the floor of the furnace will be fabricated from castables, i.e., refractory concretes, and the walls will be in the form of refractory brick; however, this too will vary with the manufacturer. An excellent discussion of refractories and their properties and uses appears in Encyclopedia of Chemical Technology, Volume 11 pages 597–632, Raymond E. Kirk and Donald F. Othmer, Editors, The Interscience Encyclopedia, Inc., New York (1953). This discussion is incorporated herein by reference.

Refractory base 40 is customarily sufficiently thick to insulate the plenum chamber 42 from the temperatures present in the reaction zone 14. The refractory base is perforated to form a plurality of vertical conduits or are occupied with gas distributor means which permit the passage of fluidizing and chlorinating gas from the chlorine distributor section 12 into the reaction zone 14. Of course, metal plate 41, upon which the base rests, is also similarly perforated and the perforations in the base and plate are aligned to provide a gas channel extending the width of the floor.

A plurality of spaced gas distributor tubes 30 can be placed in the conduits formed by the perforations in plate 41 and base 40. Such tubes, as better shown in FIG. 2, also contain internally a channel or bore 31 which is aligned with the perforations in the furnace floor, i.e., is in open communication with them, preferably in vertical alignment, and thus also assists in providing open communication between the chlorine chamber 42 and the interior of the furnace. The bore is shaped typically to produce free gas flow through the tube, i.e., without objectionable eddy currents and, except for the orifices at its lower end, is empty. That is, the bore is not occupied with gas motion imparting devices, such as described in U.S. Pat. No. 2,856,264. The gas distributor tubes are uniformly disposed throughout the base at a convenient spacing, for example, 3 to 15 inches, preferably less than 12 inches, between centers. The distribution and number of gas distributors in the base are not a part of the present invention since the number and arrangement of the tubes is a matter peculiar to the size and type of fluidized solids reactor. These matters are well known to the artisan skilled in the fluidization art. Normally, the gas distributors are evenly distributed within and across the furnace floor.

Each gas tube 30 is normally provided at its lower end with an orifice 36, which provides a substantial pressure drop. To achieve substantially uniform flow in the reactor, each orifice is designed to provide substantially the same pressure drop. At the upper end of each tube is a head 34 which has a single vertical opening 37 in its crown to allow the passage of chlorine into the chlorination zone in a substantially vertical direction and with substantially no helical motion. Thus, the movement of chlorine gas from the vertical opening 37 in the head 34 of the gas conduit 30 is substantially unidirectional, i.e., rectilinear, such direction being substantially in the upward direction and parallel to the longitudinal axis of the cylindrical reactor.

In accordance with the present invention, at least one principal linear dimension of the opening measured across the opening is not greater than seven thirty-seconds inch. This permits the particulate material being chlorinated to bridge the opening and not continually flow into it. In one embodiment, the cross-sectional area of a vertical circular opening abutting the chlorination zone can vary from about 0.00019 inch$^2$ to about 0.038 inch$^2$. Preferably, the cross-sectional area of the opening 37 will vary from about 0.019 inch$^2$ to about 0.038 inch$^2$, i.e., corresponding to circular holes with diameters of from five thirty-seconds inch to seven thirty-seconds inch.

Typically, the single vertical opening 37 in the head 34 of gas distributor 30 will be circular and vary in diameter from about one sixty-fourth inch, i.e., a cross-sectional area (C.S.A.) of about 0.00019 inch$^2$ to 7/32 of an inch (C.S.A. of about 0.038 inch$^2$). However, any geometric shape other than circular, of course, can be used. For example, the opening can be triangular, quadrilateral, e.g., rectangular or square, or any other polygonal shape. For ease of fabrication, circular, square or rectangular openings are preferred. Rectangular openings are especially preferred. While openings smaller than one sixty-fourth inch can be used, such holes are more difficult to fabricate and are subject to clogging by hard oxide encrustations formed in the bed during chlorination. In addition, the vertical opening 37 will normally be centered in the head 34 of the gas distributor tube.

As indicated above, in accordance with the present invention, at least one principal linear dimension of the opening, as measured across the opening is equal to or less than seven thirty-seconds inch. Preferably, at least one such dimension is less than seven thirty-seconds inch. The principal linear dimension(s) of the particular geometric vertical opening used will vary, of course; however, such dimension(s) are, or are closely related to the area determining dimensions of the geometric shape. For example, a circular opening has one principal linear dimension -- the diameter. The area of a circle is related to its diameter by the expression, $\pi D^2/4$. A regular quadrilateral (square or rectangle) has two principal dimensions, i.e., the length and width. The principal dimensions for an irregular guadrilateral are its width and diagonal. Similarly, for a triangle, the principal dimension will be its height, since that dimension crosses the largest opening in the triangle capable of passing the bed particles. Typically, for polygons of five or more sides, the principal dimensions will be the largest diagonals and the height of the geometric shape. Thus, by making at least one principal linear dimension across the opening of the geometric shape used equal to or less than seven thirty-seconds inch, the largest possible opening capable of passing the fluid bed particles is restricted to an area that the particles can bridge.

While the largest possible cross-sectional area of a circular opening is limited to 0.038 inch$^2$, i.e., a diameter of seven thirty-seconds inch, the cross-sectional area of a rectangular opening is not so limited. Thus, a rectangular having a width of one/sixteen inch and a length of one inch will have a cross-sectional area of about 0.06 inch$^2$. In the case of the rectangle, the limiting dimension is the width. The length can be any length but, as a practical matter, will be limited by the size of the gas distributor tube used since there must be sufficient distance between the end of the slot and the edge of the tube for the tube to retain sufficient structural strength in service. For example, a 3-inch diameter tube could easily accommodate a ¾ inch slot length and a 6-inch diameter tube can easily accommodate a slot with a 1½ inch length. Thus, while the largest cross-sectional area of a rectangular opening is not theoretically limited, generally it will range from about 0.000191 inch$^2$ to about 0.33 inch$^2$, more typically from about 0.01 inch$^2$ to about 0.33 inch$^2$.

Nozzles 36 at the lower end of gas tubes 30 are preferably fabricated from metallic materials and carefully machined to provide uniform gas flow and distribution into the reactor section of the furnace. Refractory base 40, which is heat insulating, protects the nozzles 36 from the extreme heat generated within the reactor in order to maintain the dimensions of the orifice unaltered throughout operation.

While FIG. 1 illustrates gas distributor tubes 30 as the means for introducing fluidizing gas from the plenum chamber 42 to the chlorination zone 14, it is also possible to use a refractory base having perforations or conduits of the dimensions or cross-sectional area described above at the exit opening with orifices at the bottom of the conduits. This technique would avoid the use of gas distributor tubes. However, for ease of maintenance, the use of gas distributor tubes is preferred.

FIG. 2, wherein like numerals indicate like parts, illustrates a convenient means for mounting the orifices and gas distributor tubes which together comprise the gas conduit means in the furnace bottom. As shown therein, a nipple 44, externally threaded at both ends, passes through the perforation 45 and is welded to plate 41. A T-piece 46 is screwed to the plenum chamber side of nipple 44 and is sealed at the bottom by a detachable plain plug 47. The leg 48 of T-piece 46 is closed by plug 49 through which a chlorine inlet hole 50 of predetermined diameter is drilled. A length of tubing 51 is secured to the upper part of nipple 44 by means of a union 52, and a cup-shaped steel support is welded to the union. Non-porous distributor tube or pipe 30 is fitted into the support 53 and is sealed to it by means of a suitable resin, such as an epoxy or silicone resin. The union 52, nipple 44 and T-piece 46 define a sleeve by which open connection and communication is achieved between the inlet hole 50 and the non-porus distribution tube 30. As shown, tube 30 is provided with a single vertical exit opening or port 37 of the above-described dimensions in its head 34.

While the principal dimension or cross-sectional area of exit opening 37 is limited to the amounts recited above, the bore or hole 31 within the distributor tube is not so limited. This channel can be larger than the exit opening. Normally, however, the same dimension as the exit opening will be observed in the tube to a depth of from about ¼ inch to 1½ inches.

The head 34 of tube 30 in FIG. 2 is shown extending just to the top of the refractory base 40 so that the exit opening 37 is on the same horizontal plane as the top of the refractory base. If desired, the refractory base can extend above the gas exit opening 37 provided that the dimensions of the exit are retained. Preferably, the top of the base is on the same plane as the exit opening or slightly below it, e.g., from about ½ to 3 inches. FIGS. 1, 3 and 4 illustrate embodiments wherein the refractory base is slightly, e.g., several inches, below the top of the distribution tube 30, thereby providing an exposed crown or head of tube 30.

In conducting the process described herein, the reaction zone 14 is brought to temperature in any convenient way. For example, a bed of coke or other carbonaceous material, usually havng a particle size of from 200 to 250 microns or smaller but often with a wide scatter of particle sizes is introduced into the reactor through inlet 22. The coke is ignited and air or oxygen is blown through gas distribution tube 30 to support combustion and to fluidize the coke. After the temperature of the furnace has been raised to its desired level, usually above 500° C., and preferably from 700° to 900° C., but rarely over 900° to 1400° C., the furnace is ready for commencement of the chlorination process.

The ore or like material to be chlorinated, e.g., ilmenite, rutile, arizonite, leucoxene, titanium slag and titanium concentrates, is typically finely-divided and usually has a wide scatter of particle sizes. While ore particle size can vary from as small as 40 microns to as large as 850 microns, the ore particles charged to the chlorination zone will range largely from about 75 microns to about 500 microns and have a weight average of between about 100 and 150 microns.

The aforementioned particulate ore or like material is usually mixed with powdered carbon, coke, anthracite or equivalent carbonaceous material with an average particle size of between about 200 and 250 microns or below. The amount of carbon added to the ore will vary according to other conditions, such as, for example, the oxygen content of the chlorine gas introduced into the reactor, but is usually from 10 to about 50 percent, more commonly from about 10 to 30 percent of the total amount of ore. Normally, the ore-carbon mixture is blended before feeding to the furnace although separate feeds for each can be used.

To initiate the chlorination reaction, a quantity of the ore-carbon mixture is introduced into the furnace, which is at reaction temperature, in amounts sufficient to establish a bed of from 1 to 6 feet in height. Chlorine gas is introduced into the plenum chamber 42 and flows through tubes 30 at a rate sufficient to establish a fluidized or dynamic bed.

The velocity of chlorine gas required to maintain the bed in a fluid state will vary with the average size of the particles. For example, with a mean weight particle size of about 130 microns, the velocity necessary to fluidize the particles at 800° C. can range from 2 to 100 centimeters per second. However, for maximum utilization of chlorine, the velocity of the gases preferably should be from about 6 to about 40 centimeters per second.

The chlorine introduced into the furnace chlorinates metal components in the ore-carbon bed, forming and vaporizing titanium tetrachloride and other vaporizable metal chlorides. These metal chlorides are withdrawn from the bed and reactor and are forwarded to a condensation system through reactor effluent duct means 18. As a consequence of the chlorination reaction, heat is evolved in the furnace thereby helping to maintain the temperature of the bed at reaction temperature.

The chlorination reaction can be carried out continuously by feeding chlorine, ore and carbon continuously or intermittently to the bed and withdrawing the product vapors from the reactor. The temperature of the fluidized bed can be maintained at the desired level by controlling the rate of chlorination. When the temperature is low, the rate of chlorine introduced is increased and vice versa. Ore and carbon are usually introduced at a rate sufficient to maintain a bed of at least one foot deep, preferably at least three feet deep, measured when the bed is static, i.e., with the chlorine flow off.

To insure an accurate and uniform feed of chlorine through the orifices 36, it is preferable to make use of machined orifices which produce a predetermined pressure drop (or loss in static head), as a consequence of flow therethrough. This promotes uniformity of distribution and of chlorine flow over the entire cross-sectional area of the reaction zone. Thus, it becomes important to avoid significant changes in the machined orifices as the chlorination process proceeds from day to day or week to week. Changes in the orifices can be minimized by maintaining their temperature below the temperatues at which they will be attacked chemically by the chlorinating gas. Thus, if the orifice is fabricated of iron, the temperature thereof should be maintained below about 250° C., and preferably below 200° C. If the orifice is fabricated of nickel, the temperature thereof can be somewhat higher, preferably below 600° C. This can be easily accomplished if the thickness of the refractory base 40 is sufficiently great and its heat insulating properties sufficiently high.

The chlorinating gas supplied to plenum chamber 42 is supplied well below 150° C., usually in the range of from 25° C. to 100° C. Thus, the cooling effect of the chlorinating gas also helps to maintain the temperature of the orifices below 150° C. In addition, the chlorine gas passing through the tube cools the tube and keeps it below temperatures at which it may be chlorinated. Since the refractory tubes are fabricated from materials having a high thermal conductivity, the heat from th tube is rapidly withdrawn from it by the relatively cold chlorine. Thus, the vertical gas discharge hole of the present invention provides improved cooling of the tube around the head then the prior art tubes, e.g., the tubes of FIGS. 3 and 4.

The pressure of the chlorinating gas is plenum chamber 42 is normally superatmospheric. The magnitude of this pressure must be sufficiently high at least to equal the sum of the pressure drop across the orifices, the pressure drop across the bed, the pressure drop due to frictional losses in the conduits 31. Frequently, the pressure in this chamber will be as low as 6 to 8 pounds per square inch gauge when the reaction is initiated and may rise to 20 to 25 pounds per square inch gauge or higher in later stages of the reaction. The over-all differential pressure between the interior of chamber 42 and the top of the dynamic bed undergoing chlorination also depends upon the depth of the bed. To achieve best efficiency, the depth of the bed is kept low enough so that the pressure drop across the bed itself is not more than about twice the pressure drop across the orifice. Where the drop across the orifice is from about 2 to 5 pounds per square inch, the depth of the fluidized bed usually has been kept at from about 1 to 6 feet.

FIG. 3, wherein like numerals indicate like parts, is an enlarged sectional view of the upper portion of a chlorine distributor tube having horizontal ports 38 in the head 35 of the tube for the passage of chlorine into the chlorination zone. In such a tube, which is described in U.S. Pat. No. 2,855,273, the head is hollow and closed at the top in order to prevent the fall of bed solids into bore 31. Typically, the head 35 has four such horizontal ports 38 located 90° apart around the head. If head 35 is square, one port is positioned on each face of the sides of the head. In this arrangement, the streams of chlorinating gas from adjacent distributor tubes tend to combine more rapidly than with vertical introduction of chlorine to form bubbles and produce channeling in the bed. Such channeling reduces the uniformity of gas distribution within the bed, decreases chlorine residence time in the bed and is, therefore, less efficient than when no chnneling occurs.

FIg. 4, wherein like numerals indicate like parts, is an enlarged sectional view of the upper portion of a further type of chlorine distribution tube wherein the head 34 of the gas distribution tube is also closed at the top to prevent the flow of bed solids back into bore 31, thereby clogging the conduit and possibly damaging the orifices below. This nozzle is shown to contain four ports 39 inclined downwardly from the horizontal and arranged 90° apart around the head.

The distributor tube of FIG. 4 is described in U.S. Pat. No. 3,057,701. In addition to the channeling or bubbling effect described above in connection with the tube of FIG. 3, the use of gas inlet ports, such as shown in FIG. 4, erodes the face of refractory base 40 as a result of the impingement of exiting chlorine against the refractory base. Erosion of the refractory base around the tube exposes a large portion of the tube than normally occurs and makes the tube more susceptible to fracture, thereby exposing the gas bore 31 to the bed.

The present process is more particularly described in the following examples which are intended as illustrative only since modifications and variations therein will be apparent to one skilled in the art.

EXAMPLE I

A twelve-inch diameter cylindrical column was filled to a static depth of about three feet with bed material from a commerical rutile fluid bed chlorinator. The bed was fluidized with air passing through gas distributor nozzles located at the bottom of the bed and having a single vertical outlet hole approximately five thirty-seconds inch in diameter. After about 5 minutes of fluidization, the fluidizing air was abruptly shut off and the bed defluidized. The bed was allowed to set 4 or 5 minutes while bed flow back through the gas distributor was collected. This procedure was repeated several times. The amount of bed flow back throug this gas distributor nozzle avaraged only 2.2 grams for each time the bed was defluidized. Along with this extremely low amount of bed flow back, it was also noted that general bed fluidization characteristics appeared to be better with the single vertical hold gas outlet than it was with nozzles having multiple holes positioned around the head, e.g., the bed fluidized more smoothly with less large slug type bubble formation.

EXAMPLE II

The procedure of Example I was repeated except that the gas distributor nozzles had a single vertical hole of three-sixteenths inch diameter. Again, the average amount of bed flow back each time the bed was abruptly defluidized was only 2.2 grams.

The procedure of Example I was repeated except that the vertical gas outlet hole in the gas distributor was seven thirty-seconds inch. The average amount of bed flow back each time the bed was defluidized was 28.6 grams.

The procedure of Example I was repeated except that the vertical gas outlet hole in the gas distributor was five-sixteenths inch. Bed flow back through the nozzle each time the fluidizing air was removed was continuous.

EXAMPLE III

In accordance with the procedures of Example I, the 12-inch diameter column was equipped with gas distributor nozzles having a single vertical rectangular opening. The size of the rectangular opening was 0.030 inch by 0.625 inch. The rectangular opening provided about the same outlet area as a 5/32 inch diameter opening. The bed was fluidized using air and then abruptly defluidized. The flow back of solids on defluidization of the bed was found to be only a trace amount.

The size of the rectangular opening was increased to 0.060 inch by 0.625 inch (about equivalent in area to a circular hole of 7/32 inch in diameter) and this gas distributor nozzle used to fluidize the bed. Upon defluidization, again only a trace amount of bed flow back through the vertical opening was observed.

EXAMPLE IV

A chlorinator furnace similar to that shown in FIG. 1 was equipped with gas distributor nozzles having a single vertical circular hole of eleven sixty-fourths inch in diameter. The tops of the gas distributor nozzles were substantially on the same horizontal plane as the top of refractory base so that, at the initiation of operations, only the vertical outlet opening of the gas distributor nozzle was in sight when looking down at the base from a point above it. The chlorinator was charged with a feed of rutile ore and about 20 weight percent coke and the furnace operated at a temperature of about 1880° F. Chlorine was introduced through the aforementioned gas distributor nozzles at about 22 pounds per hour per tube to fluidize the bed and chlorinate at least the titanium metal content of the bed. The bed was operated for a total of 131 days, at the end of which the reaction was terminated and the chlorinator bottom containing the experimental gas distributor nozzles inspected. An inspection of the bottom revealed that the refractory base had been eroded to a depth of about three to four inches exposing the heads of the gas distributor nozzles. Seven gas distributor nozzles were found to be broken and five distributor nozzles displayed worn crowns, i.e., the crown had worn away and the gas outlet slightly enlarged. These twelve gas distributor tubes represented less than ten percent of the total number of distributor tubes in the base.

During the above-described chlorination reaction, the bed was defluidized because of an interrruption in the chlorine supply. 12 hours after defluidization, the bed was successfully refluidized on the first attempt with chlorine and the fluidization found to be smooth and without difficulty.

The data of Examples I – IV demonstrate that chlorination of finely divided, metal-bearing ores, such as titaniferous ores, can be accomplished in a fluidized bed reactor equipped with fluidizing gas distributor nozzles having a single vertical hole without significant or detrimental bed flow back upon defluidization.

While there are above described a number of specific embodiments of the present invention, it is obviously possible to produce other embodiments and various equivalent modifications thereof without departing the spirit of the invention.

We claim:

1. A method for chlorinating particulate titanium-bearing material which comprises establishing a fluidized bed of the material in a reaction zone at temperatures at which the material chlorinates, said bed comprising titanium-bearing material having particle sizes largely in the range of 75 microns to 500 microns, said bed being fluidized by a fluidizing stream comprising chlorine, supplying the chlorine to said bed through a plurality of gas conduit means having a single verticle opening at its upper end, at least one principal linear dimension of the opening measured across the opening being not greater than 7/32 inch, so that no significant back flow of solids will occur through said vertical opening upon defluidization of said bed, and which will allow unimpeded startup upon resumption of fluidization, the chlorine thereby being introduced into the bed in a substantially rectilinear direction, and withdrawing titanium tetrachloride from the reaction zone.

2. The method of claim 1 wherein the opening is circular and the cross-sectional area of the opening is from about 0.00019 $inch^2$ to about 0.038 $inch^2$.

3. The method of claim 1 wherein the opening is rectangular.

4. The method of claim 2 wherein the cross-sectional area of the opening is from 0.019 $inch^2$ to 0.038 $inch^2$.

5. The method of claim 3 wherein the cross-sectional area of the opening is from 0.000191 $inch^2$ to 0.33 $inch^2$.

6. The method of claim 1 wherein the particles representing the weight average of the bed are in the range of from 100 to 150 microns.

7. The method of claim 3 wherein the cross-sectional area of the opening is from 0.01 $inch^2$ to 0.33 $inch^2$.

* * * * *